US008176166B2

(12) United States Patent  (10) Patent No.: US 8,176,166 B2
Hind et al.  (45) Date of Patent: May 8, 2012

(54) AUTONOMIC MANAGEMENT OF UNIFORM RESOURCE IDENTIFIERS IN UNIFORM RESOURCE IDENTIFIER BOOKMARK LISTS

(75) Inventors: John R. Hind, Raleigh, NC (US); David P. Johnson, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 736 days.

(21) Appl. No.: 11/737,232

(22) Filed: Apr. 19, 2007

(65) Prior Publication Data

US 2008/0263049 A1  Oct. 23, 2008

(51) Int. Cl.
*G06F 15/173* (2006.01)
(52) U.S. Cl. ........ 709/224; 709/203; 709/225; 709/227; 709/242; 709/245; 707/1; 707/10; 707/500; 707/501; 707/513
(58) Field of Classification Search ................. 709/242, 709/243, 245, 203, 224–229, 216–219; 707/1, 707/10, 500, 501, 102, 513
See application file for complete search history.

(56) References Cited

U.S. PATENT DOCUMENTS

| | | | | |
|---|---|---|---|---|
| 6,041,360 | A * | 3/2000 | Himmel et al. | 709/245 |
| 6,510,461 | B1 * | 1/2003 | Nielsen | 709/224 |
| 6,631,496 | B1 | 10/2003 | Li et al. | |
| 6,718,365 | B1 | 4/2004 | Dutta | |
| 6,832,350 | B1 * | 12/2004 | Bates et al. | 715/206 |
| 6,981,210 | B2 | 12/2005 | Peters et al. | |
| 7,028,032 | B1 * | 4/2006 | Diedrich et al. | 1/1 |
| 2002/0052889 | A1 * | 5/2002 | Shinoda | 707/500 |
| 2002/0116411 | A1 * | 8/2002 | Peters et al. | 707/501.1 |
| 2002/0116525 | A1 * | 8/2002 | Peters et al. | 709/242 |
| 2003/0120464 | A1 * | 6/2003 | Taft et al. | 702/186 |
| 2003/0144984 | A1 * | 7/2003 | Dunbar | 707/1 |
| 2003/0158953 | A1 | 8/2003 | Lal | |
| 2008/0172404 | A1 * | 7/2008 | Cohen | 707/102 |

FOREIGN PATENT DOCUMENTS

| | | |
|---|---|---|
| FR | 2777725 A1 | 4/1998 |
| JP | 2000092706 | 3/2000 |
| JP | 200114529 | 5/2001 |
| JP | 2006004308 | 1/2006 |

OTHER PUBLICATIONS

Pataki, Maate; KOPOI—An Online Plagiarism Search and Information Portal; ERCIM News No. 58, Jul. 2004.

* cited by examiner

*Primary Examiner* — Quang N. Nguyen
*Assistant Examiner* — Benjamin M Thieu
(74) *Attorney, Agent, or Firm* — Steven M. Greenberg, Esq.; Carey, Rodriguez, Greenberg & O'Keefe, LLP

(57) ABSTRACT

Embodiments of the present invention address deficiencies of the art in respect to URI management for bookmarks and provide a novel and non-obvious method, system and computer program product for autonomic management of URIs in a URI bookmark list. In one embodiment of the invention, a method for autonomically managing bookmarks in a bookmark list can be provided. The method can include parsing a list of bookmarks to test validity for network addresses within the bookmarks, and, for each of the bookmarks containing an invalid network address, inferring a correct network address. For example, inferring a correct network address can include comparing a chunk of an image of expected content for the bookmark with pre-stored chunks of content and retrieving a network address for a closely matching one of the pre-stored chunks of content.

21 Claims, 2 Drawing Sheets

AUTONOMIC MANAGEMENT OF UNIFORM RESOURCE IDENTIFIERS IN UNIFORM RESOURCE IDENTIFIER BOOKMARK LISTS

BACKGROUND OF THE INVENTION

1. Field of the Invention

The present invention relates to the field of uniform resource identifier (URI) bookmarking and more particularly to the management of URI bookmarks in a network enabled content browser.

2. Description of the Related Art

Content browsing refers to the retrieval and presentation of electronic content in a browser client. Content generally can include electronic documents, audio, audiovisual and video materials and imagery. Most commonly, content can be stored in a server environment and published for access by content consumers over a computer communications network such as the global Internet. Content consumers, in turn, can retrieve content over the network by reference to a network address for the content. Once retrieved, the content can be presented in a browser client including not only conventional visual browsers such as the venerable Web browser, but also in alternative browsers such as those deployed in pervasive devices and those supporting different modes of presentation such as the audible presentation of material.

Content published for consumption often can be retrieved according to a URI. As defined by the World Wide Web consortium, a URI is "the way you identify a point of content in the Internet space". A common way to identify a point of content in Internet space is through an addressing scheme including a protocol identifier such as "http", a physical server address such as "xyz.com", a file system address such as "root/sub-level" and a file name such as "myfile.txt" such that the combined URI appears as:

http://xyz.com/root/sub-level/myfile.txt referring to the electronic document "myfile.txt". For most conventional Web browsers, all content from the Web page down to the included graphics resources can be associated with and retrieved through a respective URI.

Given the vast amount of content published for accessibility over the Internet, modern content browsers provide a mechanism for ably retrieving previously accessed content. Known as a "bookmark" or "favorite" (collectively referred to as a bookmark), end users can record content of interest as a bookmark. Subsequently, end users can access a list of bookmarks in order to recall the content of interest without being compelled to recall from memory the precise URI for the content of interest.

Of course, the skilled artisan will recognize that the URI for content of interest can change from time to time as the location of content changes, or as the storage platform storing the content changes address. For example, in the Web browser context, when an end user selects a bookmark for a URI that has become out of date, a hypertext transfer protocol (HTTP) return code in the 300, 400 or 500 range can be returned indicating a potential problem with the URI. Because bookmark lists can become overpopulated with dozens of bookmarks, however, ensuring correct URIs for each bookmark can become a management nightmare for the end user.

U.S. Pat. No. 6,981,210 to Peters et al. for Self-Maintaining Web Browser Bookmarks, a patent application that has been commonly assigned to the assignee of the present patent application, partially addresses the problem of bookmark management in that a method for automatically updating bookmarks stored by a Web browser is provided when the bookmarked uniform resource locator (URL) is invalid and a redirect to an alternate URL is specified. In Peters et al., a Web page author places redirect markups in the markup associated with a particular URL. When the redirect markup is received by the Web browser, the user of the browser is given the option of replacing the existing bookmarked original URL with the redirect URL. Thus, Peters et al. at least addresses the maintenance of bookmarks in response to a redirect of a request for content.

BRIEF SUMMARY OF THE INVENTION

Embodiments of the present invention address deficiencies of the art in respect to URI management for bookmarks and provide a novel and non-obvious method, system and computer program product for autonomic management of URIs in a URI bookmark list. In one embodiment of the invention, a method for autonomically managing bookmarks in a bookmark list can be provided. The method can include testing a bookmark corresponding to specified content for validity against a network address disposed within the bookmark, and, in response to determining the bookmark to refer to content that is not consistent with the specified content, inferring a replacement network address for the bookmark, the replacement address referencing content that is consistent with the specified content.

The method further can include parsing a list of bookmarks to test validity for network addresses within the bookmarks, and, for each of the bookmarks containing an invalid network address, inferring a correct network address. For example, inferring a correct network address can include comparing a chunk of an image of expected content for the bookmark with pre-stored chunks of content and retrieving a network address for a closely matching one of the pre-stored chunks of content In one aspect of the embodiment, parsing a list of bookmarks to test validity for network addresses within the bookmarks can include sequentially loading the bookmarks in the list, issuing a request to a URI contained in the bookmark for each bookmark in the list, and determining validity for each bookmark based upon receiving an error code indicating a permanent error in response to the request. In another aspect of the embodiment, parsing a list of bookmarks to test validity for network addresses within the bookmarks can include sequentially loading the bookmarks in the list, issuing a request to a URI contained in the bookmark for each bookmark in the list, and determining validity for each bookmark based upon receiving in response to the request, content that is not consistent with content associated with the bookmark.

In another embodiment of the invention, an autonomic bookmark management data processing system can be provided. The system can include a content browser, a bookmark list coupled to the content browser, and autonomic bookmark management logic. The logic can include program code enabled to parse bookmarks in the bookmark list to test validity for network addresses within the bookmarks and, for each of the bookmarks containing an invalid network address, inferring a correct network address. In this regard, each of the network address can include a URI. As well, a helper service can be configured to infer a correct network address for an invalid bookmark by comparing chunks of expected content for the invalid bookmark with pre-stored content and correlating similar chunks of the pre-stored content with a network address substituting for an address in the invalid bookmark as the correct network address.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for autonomically managing bookmarks in a bookmark list. In accordance with an embodiment of the present invention, an autonomic bookmark manager can process each bookmark in a bookmark list, testing the validity of URI in the bookmark. The validity can include not only whether the invocation of the bookmark returns content rather than an error, but also whether the content returned is consistent with the content for the bookmark when originally added. Where a bookmark is determined to be invalid, a new URI for the bookmark can be inferred and the invalid URI for the bookmark can be replaced with the new URI.

Figure 1:
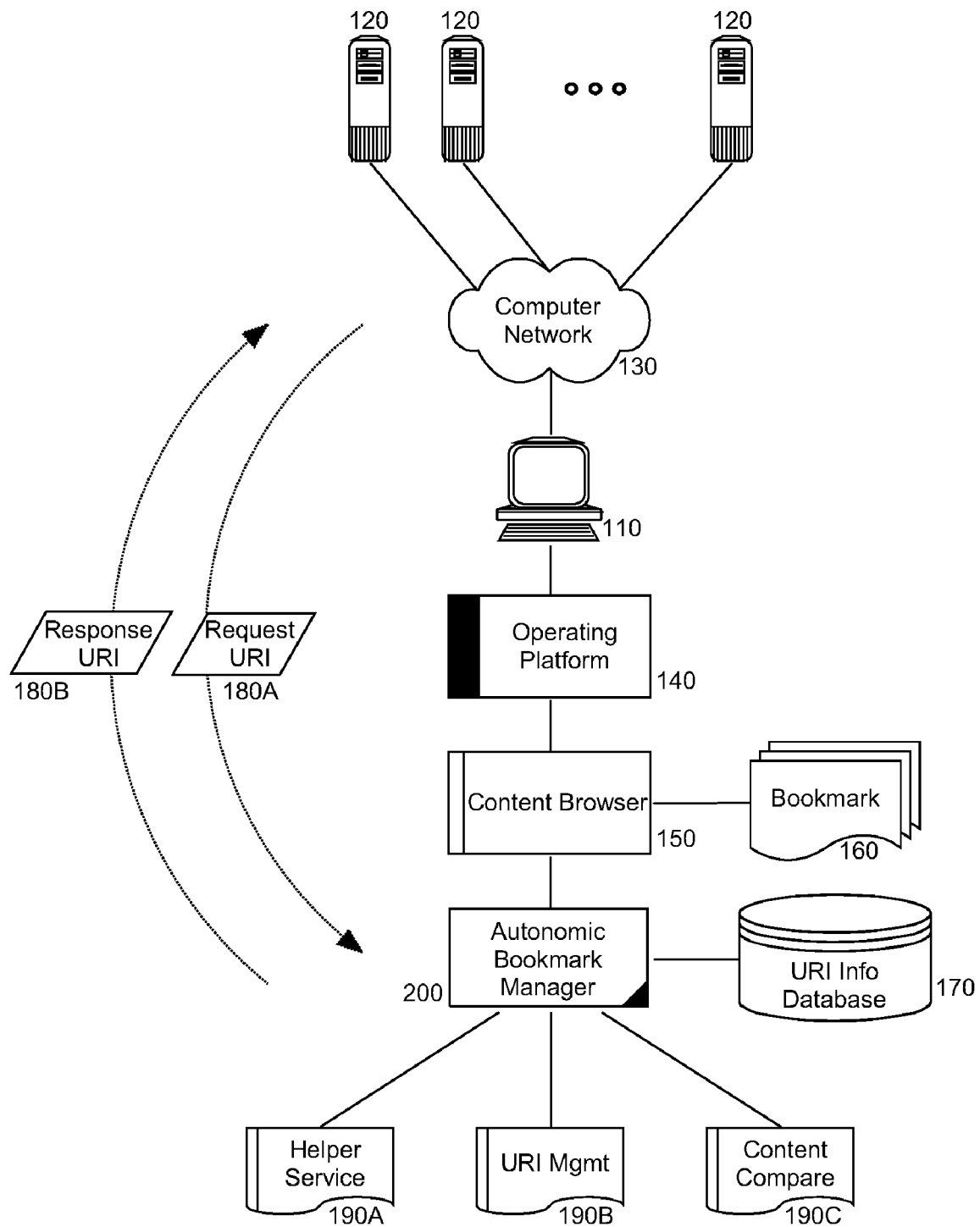
FIG. 1 is a schematic illustration of a content browsing data processing system configured for autonomically managing bookmarked URIs in a bookmark list; and, FIG. 2 is a flow chart illustrating a process for autonomically managing bookmarked URIs in a book.

In illustration, FIG. 1 is a schematic illustration of a content browsing data processing system configured for autonomically managing bookmarked URIs in a bookmark list. The system can include a host computing device 110 coupled to one or more content servers 120 over a computer communications network 130. The host computing device 110 can be a personal computing device, or a pervasive device, and can include an operating platform 140, for instance an operating system or at least a virtual machine. The operating platform 140 in turn can support the operation of a content browser 150, for example a Web browser, in which content can be rendered that has been retrieved from one or more of the content servers 120 over the computer communications network 130.

The content browser 150 can include bookmarking functionality in that one or more bookmarks in a bookmark list 160 can be stored by the content browser 150 at the behest of an interacting end user. Each of the bookmarks in the bookmark list 160 can include a network address pointing to a content source, for example a URI. An autonomic bookmark manager 200 further can be coupled to the content browser 150 in order to access the bookmarks in the bookmark list 160. The autonomic bookmark manager 200 can include program code enabled to process each bookmark in the bookmark list 160 in order to identify invalid bookmarks and to correct, wherever possible, invalid ones of the bookmarks in the bookmark list 160.

Specifically, the program code of the autonomic bookmark manager 200 can be enabled to test each URI in a corresponding bookmark with a request 180A. A response 180B to the request 180A can be returned and an error condition can be detected such as HTTP return code 301 indicating a permanent change in the URI, or an HTTP return code in the range of 400 to 599 such that the HTTP return indicates a permanent problem such as URI not found and not a temporary server or communications problem. In response to detecting a permanent problem, the bookmark can be removed from the bookmark list or marked as invalid such that an end user can manually and selectively remove the bookmark. Alternatively, in a more sophisticated aspect of the invention, the program code of the autonomic bookmark manager 200 can be enabled to infer a correction to the invalid bookmark.

To that end, a helper service 190A can be coupled to the autonomic bookmark manager 200. The helper service 190A can be configured to seek a corrected location of the content associated with an invalid bookmark such as a revised form of the content stored at a different network address, or a successor in interest to the content associated with the invalid bookmark. In particular, the helper service 190A can infer a replacement bookmark by reference to a URI information database 170. The URI information database 170 can include updates to stored URIs and meta-information for the stored URIs. The URI information database 170 can be disposed externally to the host computing device 110 and can be configured to be accessed by the content servers 120 so that the content servers 120 can update the URI information database 170 with updates to selected URIs.

Notably, even if an error condition cannot be expressly detected from within the response 180B, coupled content compare service 190C can be configured to compare the content for the bookmark associated with the request 180A with the content associated with the response 180B. To the extent that the content for the bookmark associated with the request 180A is not consistent with the content associated with the response 180B, the URI for the bookmark can be determined to be invalid. In any event, though the removal or modification of bookmarks in the bookmark list 160 can be automatically applied, coupled URI management service 190B can provide a separate user interface to manually apply changes to invalid bookmarks in the bookmark list 160.

Figure 2:
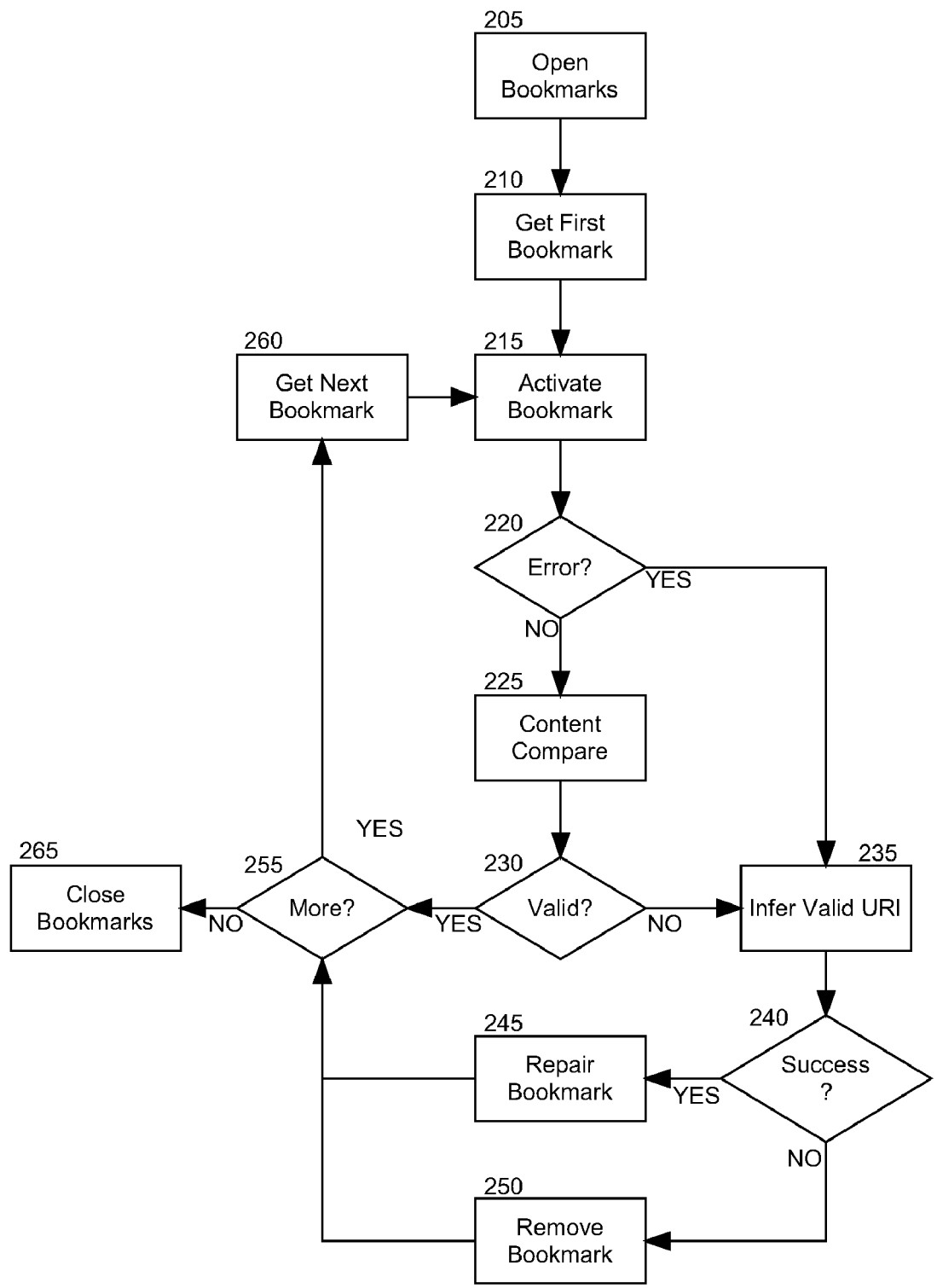

Turning now to FIG. 2, a flow chart is provided to illustrate a process for autonomically managing bookmarked URIs in a book. Beginning in block 205, the bookmark list can be opened for processing and in block 210, a first bookmark can be retrieved for processing. In block 215, the bookmark can be activated externally to the view of an associated content browser (preferably in the background) in order to test the validity of the network address reference within the bookmark. In decision block 220, if an error indicating a permanent error condition is not returned, in block 225, the content associated with the returned content for the bookmark can be compared to the expected content for the bookmark to ensure the validity of the bookmark. In decision block 230, if the content of the returned content is not consistent with the expected content for the bookmark, the process can continue in block 235 as if an error condition had arisen in decision block 220.

In block 235, a valid network address for the content in the bookmark can be inferred. For instance, the network address information database can be scanned to locate an updated network address for the bookmark. Alternatively, a different network address associated with the bookmark can be located, such as the home page of a site hosting the desired content. In an advanced embodiment of the invention, an image of the content associated with the bookmark can be compared chunk by chunk to content chunks in a remotely disposed repository of content in order to identify a most similar content entry. Once similar content has been identified, a corresponding network address for the content can be returned for association with the invalid bookmark.

In any event, in decision block 240, if a valid network address can be inferred for the invalid address, in block 245 the bookmark can be modified to reflect the inferred network address. Otherwise, in block 250 the bookmark can be removed from the bookmark list (or marked as invalid so that an end user can manually repair the bookmark). Finally, in decision block 255, if no further bookmarks remain to be process, the bookmark list can be closed in block 265. Otherwise, in block 260 a next bookmark in the bookmark list can be retrieved and the process can repeat through block 215.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for autonomic bookmark management within a content browser, the method comprising:
    activating externally to a view of the content browser a bookmark to test validity of a network address disposed within the bookmark;
    receiving a returned content pointed to by the network address;
    comparing the returned content to expected content for the bookmark; and
    in response to determining that the returned content is not consistent with the expected content, inferring a replacement network address for the bookmark, the replacement address referencing content that is consistent with the expected content;
    wherein inferring the replacement network address, comprises:
    comparing a chunk of an image of expected content for the bookmark with pre-stored chunks of content; and,
    retrieving a network address pointing to a closely matching one of the pre-stored chunks of content.

2. The method of claim 1, further comprising:
    parsing a list of bookmarks to test validity for network addresses within the bookmarks; and,
    for each of the bookmarks containing an invalid network address, inferring a correct network address.

3. The method of claim 2, wherein the parsing comprises:
    sequentially loading the bookmarks in the list;
    for each bookmark, issuing a request to a uniform resource identifier (URI) contained in the bookmark; and,
    determining validity for each bookmark based upon receiving an error code indicating a permanent error in response to the request.

4. The method of claim 3, wherein the determining validity for each bookmark is based upon receiving a hypertext transfer protocol (HTTP) return code of 301 or in a range of 400 to 599.

5. The method of claim 2, wherein the parsing comprises:
    sequentially loading the bookmarks in the list;
    for each bookmark, issuing a request to a uniform resource identifier (URI) contained in the bookmark; and,
    determining validity for each bookmark based upon receiving, in response to the request, content that is not consistent with content associated with the bookmark.

6. The method of claim 2, further comprising automatically removing invalid ones of the bookmarks from the bookmark list.

7. The method of claim 2, further comprising automatically correcting invalid ones of the bookmarks in the bookmark list with correct network addresses.

8. The method of claim 2, further comprising providing a separate user interface through which an end user corrects identified invalid ones of the bookmarks in the bookmark list.

9. The method of claim 1, wherein the inferring a replacement network address comprises accessing a uniform resource identifier (URI) database disposed externally to a host computer device performing the inferring.

10. An autonomic bookmark management data processing system comprising:
    a content browser;
    a bookmark list coupled to the content browser; and,
    a processor including autonomic bookmark management logic comprising program code configured to
        externally to a view of the content browser, parse bookmarks in the bookmark list to test validity for network addresses within the bookmarks, each network address having expected content associated therewith,
        receive a returned content pointed to by the network address,
        compare the returned content to the expected content respectively associated with the bookmarks,
        designating, as invalid, a network address upon the returned content not consistent with the expected content associated with the network address, and
        for each of the bookmarks containing an invalid network address, inferring a correct network address;

wherein inferring a correct network address, comprises:
    comparing a chunk of an image of expected content for the bookmark with pre-stored chunks of content; and,
    retrieving a network address pointing to a closely matching one of the pre-stored chunks of content.

11. The system of claim 10, wherein
each of the network address comprises a uniform resource identifier (URI).

12. The system of claim 10, further comprising
a helper service configured to infer a correct network address for an invalid bookmark by
comparing chunks of expected content for the invalid bookmark with pre-stored content and
correlating similar chunks of the pre-stored content with a network address substituting for an address in the invalid bookmark as the correct network address.

13. The system of claim 10, further comprising:
a uniform resource identifier (URI) database, disposed externally to a host computer device hosting the content browser, wherein
the autonomic bookmark management logic comprising program code configured to access the URI database to infer the correct network address.

14. A computer program product comprising a non-transitory computer usable storage medium, the computer usable storage medium including computer usable program code for autonomically managing bookmarks in a bookmark list, the computer usable program code, when executed on a computer hardware device including a content browser, causing the computer hardware device to perform:
    activating externally to a view of the content browser a bookmark to test validity of a network address disposed within the bookmark;
    receiving a returned content pointed to by the network address;
    comparing the returned content to expected content for the bookmark; and
    in response to determining that the returned content is not consistent with the expected content, inferring a replacement network address for the bookmark, the replacement address referencing content that is consistent with the expected content;
    wherein inferring the replacement network address, comprises:
        comparing a chunk of an image of expected content for the bookmark with pre-stored chunks of content; and,
        retrieving a network address pointing to a closely matching one of the pre-stored chunks of content.

15. The computer program product of claim 14, further comprising:
    parsing a list of bookmarks to test validity for network addresses within the bookmarks; and,
    inferring a correct network address for each of the bookmarks containing an invalid network address.

16. The computer program product of claim 15, wherein the parsing comprises:
    sequentially loading the bookmarks in the list;
    issuing a request to a uniform resource identifier (URI) contained in the bookmark for each bookmark in the list; and,
    determining validity for each bookmark based upon receiving an error code indicating a permanent error in response to the request.

17. The computer program product of claim 16, wherein
the determining validity for each bookmark is based upon receiving a hypertext transfer protocol (HTTP) return code of 301 or in a range of 400 to 599.

18. The computer program product of claim 15, wherein the parsing comprises:
    sequentially loading the bookmarks in the list;
    issuing a request to a uniform resource identifier (URI) contained in the bookmark for each bookmark in the list; and,
    determining validity for each bookmark based upon receiving in response to the request, content that is not consistent with content associated with the bookmark.

19. The computer program product of claim 15, further comprising
automatically removing invalid ones of the bookmarks from the bookmark list.

20. The computer program product of claim 15, further comprising
automatically correcting invalid ones of the bookmarks in the bookmark list with correct network addresses.

21. The computer program product of claim 15, further comprising
providing a separate user interface through which an end user corrects identified invalid ones of the bookmarks in the bookmark list.

* * * * *